United States Patent Office 3,478,115
Patented Nov. 11, 1969

3,478,115
METHOD OF MAKING POLYMETHYLOLALKANE MIXTURES
Jesse B. Bronstein, Jr., South Whitehall Township, Pa., assignor, by mesne assignments, to Commercial Solvents Corporation, a corporation of Maryland
No Drawing. Filed May 5, 1967, Ser. No. 636,279
Int. Cl. C07c 31/18
U.S. Cl. 260—635         18 Claims

ABSTRACT OF THE DISCLOSURE

A first alkyl aldehyde is reacted with a substantial excess of formaldehyde to form the corresponding polymethylolalkane following which a second alkyl aldehyde, having at least one more carbon atom than the first, is reacted with the remaining formaldehyde, in the presence of the first-formed polymethylolalkane, to form the corresponding trimethylolalkane.

---

The preparation of pentaerythritol (PE) by reacting acetaldehyde with formaldehyde in alkaline aqueous medium is well known. U.S. Patent 2,790,836 discloses the use of a large excess of formaldehyde to favor formation of monopentaerythritol (mono PE) and to reduce or eliminate side reactions favoring polypentaerythritols, like dipentaerythritol (di PE), and undesirable color-forming bodies. The excess formaldehyde is then removed by distillation. The preparation of trimethylolalkanes, like trimethylolethane (TME), trimethylolpropane (TMP) and trimethylolbutane (TMB), by reacting the appropriate alkyl aldehyde (propionaldehyde, n-butyraldehyde and n-valeraldehyde, respectively) with formaldehyde in alkaline aqueous medium is also well known (see, for example, U.S. Patent 3,097,245). It has also been suggested to employ excess formaldehyde in this reaction followed by distilling off the excess formaldehyde (U.S. Patent 2,790,837).

The distillation of the excess formaldehyde from such reaction products (PE, TME, TMP and TMB) presents difficulties, requiring pressure and carefully controlled conditions in actual commercial operation.

On the other hand, mixtures of polymethylolalkanes, such as mixtures of mono PE and TME, would be valuable raw materials in, for example, the preparation of alkyd resins. Prior to the present invention, such mixtures were made by blending mono PE and TME which had been separately made. Unless excess formaldehyde were used in the preparation of the mono PE, with the attendant difficulty of removing the remaining formaldehyde, the mono PE had to be separated from the reaction mixture containing also the polypentaerythritols, principally di PE. This separation also involves difficulties. Attempts to make such mixtures directly by reacting the appropriate aldehydes simultaneously with formaldehyde resulted in the formation of undesired amounts of di PE.

It is the principal object of the present invention to provide a novel process for making polymethylolalkanes.

It is another object of the present invention to provide a novel process for making mixtures of polymethylolalkanes.

It is a further object of the present invention to provide a process for making a mixture of mono PE and a trimethylolalkane substantially free of di PE.

Still another object is to provide a process for making mixtures of polymethyloalkanes, such as a mixture of mono PE and a trimethylolalkane—especially TME—which is substantially less expensive than prior procedures for making such mixtures, and which, nevertheless results directly in a product high in the desired polymethylolalkanes and low in undesired side reaction products.

Other objects will become apparent from a consideration of the following specification and claims.

The process of the present invention comprises reacting with formaldehyde, in aqueous alkaline medium, a first alkyl aldehyde selected from the group consisting of acetaldehyde, propionaldehyde and n-butyraldehyde to form the corresponding polymethylolalkane, there being formaldehyde present during said reaction in excess of that required for reaction with said first alkyl aldehyde in an amount of at least 1.5 moles thereof per mole of said first alkyl aldehyde, and thereafter reacting with said excess formaldehyde in said aqueous alkaline medium containing said polymethylolalkane a second alkyl aldehyde selected from the group consisting of propionaldehyde, n-butyraldehyde and n-valeraldehyde, said second alkyl aldehyde containing at least one more carbon atom than said first alkyl aldehyde, to form the corresponding trimethylolalkane, said second alkyl aldehyde being in an amount of about ⅓ mole thereof per mole of said excess formaldehyde.

It will be noted from the foregoing that the first reaction—between the first alkyl aldehyde and formaldehyde—takes place in the presence of a substantial excess of formaldehyde, and thus occurs under conditions favoring formation of desired monomeric product, for example, mono PE when acetaldehyde is the alkyl aldehyde employed, in high yield. Yet, according to the present process, there is no need to remove this excess formaldehyde since it is consumed during the second reaction—involving the second alkyl aldehyde—to provide the second desired polymethylolalkane also in high yield. This stage-wise process involving two distinct reactions, the second taking place in the presence of the reaction product from the first, to provide a mixture consisting essentially of the two desired compounds is believed to be unusual. In this connection, carrying out the two reactions simultaneously, as stated, provides unsatisfactory results, as does reversing the stage-wise procedure by employing the higher alkyl aldehyde, such as propionaldehyde, first and the lower alkyl aldehyde, such as acetaldehyde second.

The alkyl aldehyde used in the first reaction, designated herein as the first alkyl aldehyde, will be acetaldehyde, propionaldehyde or n-butyraldehyde. The alkyl aldehyde used in the second reaction, designated herein the second alkyl aldehyde, will be propionaldehyde, n-butyraldehyde or n-valeraldehyde, and will have at least one more carbon atom than the first alkyl aldehyde. Thus, when acetaldehyde is the first alkyl aldehyde, the second alkyl aldehyde may be propionaldehyde, n-butyraldehyde or n-valeraldehyde; when propionaldehyde is the first alkyl aldehyde, the second alkyl aldehyde may be n-butyraldehyde or n-valeraldehyde, and so on.

The reaction involved when acetaldehyde is reacted with formaldehyde is represented by the equation:

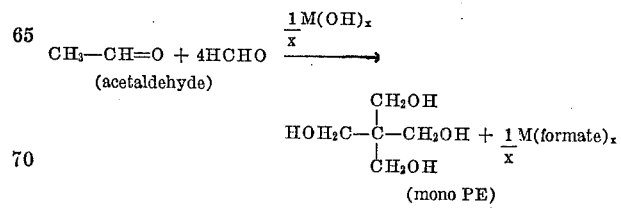

The reaction involved when propionaldehyde, n-butyraldehyde or n-valeraldehyde is reacted with formaldehyde is represented by the equation:

(II)

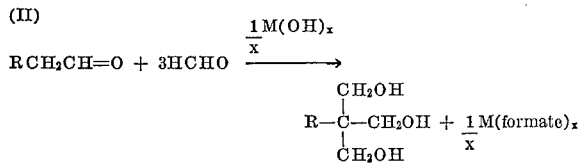

$$RCH_2CH=O + 3HCHO \xrightarrow{\frac{1}{x}M(OH)_x} \begin{matrix} CH_2OH \\ | \\ R-C-CH_2OH \\ | \\ CH_2OH \end{matrix} + \frac{1}{x}M(formate)_x$$

In the foregoing equations, M represents the cation of the alkaline catalyst, $x$ represents its valence and R is a straight chain alkyl group containing from 1 to 3 carbon atoms. It will be noted from the equations that four moles of formaldehyde are required for each mole of acetaldehyde to make mono PE and that three moles of formaldehyde are required for each mole of the higher alkyl aldehydes ($RCH_2CH=O$) to make the corresponding trimethylolalkane.

In accordance with the present invention, the reaction between formaldehyde and the first alkyl aldehyde takes place in the presence of a substantial excess of formaldehyde above that stoichiometrically required for reaction with the particular first alkyl aldehyde. This excess amounts to at least 1.5 mole of formaldehyde per mole of first alkyl aldehyde. Thus, when the first alkyl aldehyde is acetaldehyde the total formaldehyde present is at least 5.5 moles thereof per mole of acetaldehyde, and when the first alkyl aldehyde is propionaldehyde or n-butyraldehyde, the total formaldehyde present is at least 4.5 moles per mole of such alkyl aldehyde. Since the second alkyl aldehyde will require three moles of formaldehyde (⅓ mole of second alkyl aldehyde per mole of excess formaldehyde), the foregoing means that as little as 0.5 mole of second alkyl aldehyde, per mole of first alkyl aldehyde, may be reacted with the excess formaldehyde. The amount of excess formaldehyde present during reaction with the first alkyl aldehyde may go as high as about 30 moles per mole of first alkyl aldehyde in which case a corresponding larger number of moles of second alkyl aldehyde, per mole of first alkyl aldehyde, may be reacted.

Typical combinations of first alkyl aldehyde, second alkyl aldehyde and formaldehyde are set forth in the following table where the digits refer to number of moles used, "A" refers to acetaldehyde, "P" refers to propionaldehyde, "B" refers to n-butyraldehyde and "V" refers to n-valeraldehyde:

TABLE

| Moles first aldehyde | Moles second aldehyde | Moles formaldehyde |
| --- | --- | --- |
| 1 A | 0.5 P, B or V | 5.5 |
| 1 A | 1 P, B or V | 7 |
| 1 A | 3 P, B or V | 13 |
| 1 A | 6 P, B or V | 22 |
| 1 A | 7 P, B or V | 25 |
| 1 A | 10 P, B or V | 34 |
| 1 P | 0.5 B or V | 4.5 |
| 1 P | 1 B or V | 6 |
| 1 P | 2 B or V | 9 |
| 1 B | 0.5 V | 4.5 |
| 1 B | 1 V | 6 |
| 1 B | 2 V | 9 |

The present invention is particularly applicable to preparing a mixture of mono PE and TME from acetaldehyde, propionaldehyde and formaldehyde using, preferably, per mole of acetaldehyde, from about 1 to about 3 moles of propionaldehyde and from about 7 to about 13 moles of formaldehyde depending upon the number of moles of propionaldehyde.

In the foregoing discussion and table, the number of moles of formaldehyde set forth are those stoichiometrically required for the total moles of first and second alkyl aldehydes. However, in practice it is preferred to employ a slight molar excess, about 2–10%, of formaldehyde over that theoretically required to combine with the second alkyl aldehyde. This excess is so small, however, as not to require removal.

The first reaction involves reacting the first alkyl aldehyde with the excess formaldehyde in alkaline aqueous medium in accordance with known procedure. Generally speaking, this involves simply mixing the first alkyl aldehyde, aqueous formaldehyde and alkaline catalyst. The exact order of addition is not critical. For example, the first alkyl aldehyde and the alkaline catalyst may be added separately and simultaneously to the aqueous formaldehyde solution, or the alkaline catalyst may be pre-mixed with the aqueous formaldehyde solution following which the first alkyl aldehyde may be added, or the first alkyl aldehyde and aqueous formaldehyde solution may be pre-mixed following which the alkaline catalyst may be added thereto. In accordance with preferred practice, the first alkyl aldehyde and the alkaline catalyst, the latter as an aqueous solution or suspension thereof, are added separately but simultaneously to the aqueous formaldehyde solution. In batch operation this addition may take place over a period of from about ¼, with good temperature control, to about 2 hours. In continuous operation, of course, the first alkyl aldehyde and alkaline catalyst may be continuously added to a moving stream of aqueous formaldehyde while observing the proper proportional relationships.

As stated the reaction medium will be alkaline during the reaction. Hence, sufficient alkaline catalyst will be present at all times during the course of the reaction to provide a pH of at least about 9 and preferably at least about 10. There is no need for the pH to exceed 13. Especially suitable alkaline catalysts are NaOH, LiOH and $Ca(OH)_2$. KOH may also be used but is not preferred when the first alkyl aldehyde is acetaldehyde since, as known, with acetaldehyde KOH tends to form higher polyols. Lime is the preferred alkaline catalyst. From Equations I and II it will be seen that one equivalent of alkaline catalyst is required for each mole of alkyl aldehyde. In practice it is preferred to have some excess present, like from about 5 to about 50%, by weight, excess, preferably from about 10 to about 25%, to insure maintenance of the desired pH.

The reaction medium will also be aqueous, as stated. Formaldehyde is available as an aqueous solution thereof, and in accordance with the present invention the initial formaldehyde concentration in its aqueous solution is from about 5 to about 25%, preferably from about 10 to about 20%, by weight. It is preferred practice to add the alkaline catalyst as an aqueous dispersion thereof, that is as a solution when water-soluble like NaOH, KOH and LiOH, or as a suspension when water-insoluble like $Ca(OH)_2$. Hence in the total first reaction mixture, the water content will be in the neighborhood of from about 70 to about 90% by weight.

The reaction is exothermic, and the temperature of the reaction mixture may rise to as high as about 70° C., particularly when, NaOH is the alkaline catalyst. With efficient cooling the temperature may be held to as low as 20° C., or even 10° C. According to preferred practice, the temperature of the reaction mixture is held at between about 25 and about 45° C.

The reaction is complete when the first alkyl aldehyde has essentially completely combined with the required amount of formaldehyde to form the corresponding polymethylolalkane. This may be noted when the evolution of heat subsides. Completion of the first reaction may also be determined by measuring the formaldehyde content of the reaction mixture noting when the difference between it and the original quantity of formaldehyde accounts for the theoretical amount consumed. The exact time for the reaction to become completed may depend upon various factors, well known to those skilled in this art, but in general an elapsed time of from about 1 to about 3 or 4 hours is sufficient.

The second reaction, involving the second alkyl aldehyde, may then be commenced by adding the second alkyl aldehyde and alkaline catalyst to the reaction product from the first reaction containing the polymethylolalkane of the first reaction and the excess formaldehyde as well as water and excess alkaline catalyst.

As will be apparent from the foregoing, the amount of second alkyl aldehyde added will be essentially ⅓ mole thereof per mole of excess formaldehyde present, in the preferred embodiment allowance being made for the slight excess of formaldehyde referred to above. Here again preferred practice involves adding the second alkyl aldehyde and an aqueous dispersion of the alkaline catalyst separately and simultaneously. However, the order of addition is not critical, and a portion or all of the alkaline catalyst could be added first followed by the second alkyl aldehyde, or a portion or all of second alkyl aldehyde could be added first followed by the alkaline catalyst.

Since, as in the first reaction, the second reaction requires alkaline conditions, the alkaline catalyst, which may be as described above, will be added at a rate and in an amount to insure the aforesaid desired alkaline pH conditions of at least 9 and preferably at least 10.

Also, as in the first reaction, the second reaction is exothermic, and the temperature conditions discussed above in connection with the first reaction also apply here. In the preferred embodiment involving the preparation of a mixture of mono PE and TME using acetaldehyde and propionaldehyde as the alkyl aldehyde, the temperature during the second reaction is preferably from about 20 to about 30° C.

The second reaction proceeds until substantially all of the second alkyl aldehyde has combined with the excess formaldehyde to produce the corresponding trimethylolalkane. This may be determined by measuring the formaldehyde content of the reaction mixture and noting when it indicates that the theoretical amount of formaldehyde has been consumed.

The resulting reaction mixture is alkaline, and this alkalinity should be reduced to a pH below 8 and down to about 5, preferably to a pH from about 6 to about 7. Any water soluble inorganic or organic acid might be used in this neutralization. Formic acid is particularly suitable since it does not introduce any extraneous impurity, as is also the case with acid cation exchange resins. Carbon dioxide is especially suitable when lime has been used as the alkaline catalyst. Hydrochloric, sulfuric, oxalic and acetic acids are examples of other acids that can be used.

Following filtration if necessary or desirable to remove solid material that may be present, the reaction mixture may then be concentrated so as to precipitate as much formate salt as reasonably possible. The precipitate may then be removed as by centrifuging or filtration.

In accordance with preferred practice, the remaining ionizable material is removed from the solution by ion exchange. However, it may be advisable to dilute the material to a water content of from about 50 to about 70% before subjecting it to ion exchange. During ion exchange, a cation exchange resin is employed to remove cations and a strongly basic anion exchange resin is employed to remove anions, like formic acid anions, and color bodies which may be present.

The acidity of the cation exchange resin is not critical, since even weakly acidic resins will remove inorganic alkali and alkaline earth metal cations. Typical cation exchange resins are those which contain a large plurality of sulfonic acid groups in the resin molecule, substituted on an aromatic isocyclic or heterocyclic ring, or on an aliphatic chain which may itself be substituted on an aromatic ring. These resins are prepared by interreaction of an aldehyde, a phenol and sulfuric acid or a sulfite, or by sulfonating a resin having an aromatic ring in the molecule, such as, divinylbenzene-crosslinked polystyrene, tannin-aldehyde and phenol-aldehyde resins.

Typical resins of this class are described in Patent No. 2,204,539 to Hans Wassenegger and Karl Jaeger, dated June 11, 1940, No. 2,366,007 to Gaetano F. D'Alelio, dated Dec. 26, 1944 and No. 2,372,233 to Jack T. Thurston, dated Mar. 27, 1945. Nuclear sulfonic acid type resins available commercially are Amberlite IR–120 (available from the Rohm and Haas Company, Dowex 50 (the resin set forth in Patent No. 2,366,007 and available commercially from the Dow Chemical Company) Permutit Q (a sulfonated styrene type) and Nalcite HGR (a sulfonated divinylbenzene-crosslinked polystyrene available from Nalco Chemical Company).

Strongly acidic carboxylic acid-type cation exchange resins, such as Permutit H, and the chloracetic acid containing resins, also are satisfactory.

It is important that the anion exchange resin be strongly basic, since only strongly basic materials are capable of removing undesirable color-forming by-products. A preferred class of strongly basic anion exchange resins is known to those skilled in the art as the quaternary ammonium anion exchange resins. These contain a large plurality of available quaternary ammonium groups on the resin molecule, substituted on an aromatic isocyclic or heterocyclic ring or on an aliphatic chain, which may itself be substituted on an aromatic ring, and are obtained by polymerization of an aromatic amine an an aldehyde, such as formaldehyde, or a polyamide, a phenol and an aldehyde, such as formaldehyde, and then quaternizing the amino group in the resin, as shown, for example in U.S. Patent No. 2,543,666 to Malden W. Michael, dated Feb. 27, 1951. This class of resin may also be made by polymerizing a quaternary ammonium salt, a phenol and an aldehyde, or by polymerizing an aromatic benzene containing an ethylenic substituent, like divinylbenzene-crosslinked polystyrene, and one or more quaternary ammonium groups. Commercially available quarternary ammonium anion exchange resins are sold under the trade names Amberlite IRA*400 and Amberlite IRA–410 (available from the Rohm and Haas Company), Dowex 1 and Dowex 2 (available from the Dow Chemical Company) Nalcite SBR and Nalcite SAR (available from Nalco Chemical Company), and Permutit S–2.

Further details of such ion exchange treatment will be found in U.S. Patent 3,097,245, the disclosure of which is incorporated herein by reference.

In accordance with preferred practice, the solution is passed first through the cation exchange resin and then through the strong base anion exchange resin. Advantageously, the material is also subjected to treatment with a weak base anion exchange resin between the cation exchange resin treatment and the strong base anion exchange resin treatment. An example of a suitable weak base anion exchange resin in this regard is a divinylbenzene-crosslinked polystyrene resin containing secondary and tertiary amine groups, such as Amberlite IR–45, of the Rohm and Haas Company.

The resulting product may then be marketed and used as such or it may be dried, by evaporating the water, to a solid product. The product is particularly useful as a polyol in the manufacture of alkyd resin replacing to advantage the more expensive synthetic mixtures of polymethylolalkanes prepared by mixing separately prepared pure polymethylolalkanes.

The following examples are given for the purpose of illustration and are not to be considered as limiting the scope of the invention in any way.

EXAMPLE 1

In this example, acetaldehyde and propionaldehyde are reacted with formaldehyde, the mole ratios being 1.5:-2.5:14.

Two hundred pounds of water are mixed with 125.5 lbs. of a 34.02% aqueous solution of formaldehyde (1.4 lb. mole). Over a period of ½ hour, 6.6 lbs. (0.15 lb. mole) of acetaldehyde and 44 lbs. of a lime slurry (prepared by mixing 17.5 lbs. of calcium hydroxide and 70 lbs. of water) are added to the formaldehyde solution, keeping the temperature from exceeding 30° C. Thereafter the mixture is stirred for 2 hours. The remainder of the lime slurry and 14.9 lbs. of propionaldehyde (0.25 lb. mole) are then added maintaining the temperature below 30° C., the lime addition taking ½ hour and the propionaldehyde addition taking 1½ hours. The vessel containing the lime slurry is washed with 15 lbs. of water which is added to the reaction mixture. The mixture is stirred to an aldehyde end point of 0.36%, and neutralized to pH 6–7 with 1 lb. of formic acid (90%, technical).

The solution is filtered to remove any suspended solids and passed in succession through three ion exchange columns containing the following, respectively: (1) divinylbenzene-crosslinked polystyrene containing sulfonic acid groups, a strong acid cation exchange resin ("Nalcite HGR" of Nalco Chemical Co.); (2) divinylbenzene-crosslinked polystyrene containing secondary- and tertiary amine groups, a weak base anion exchange resin ("Amberlite IR–45" of Rohm & Haas Company); and (3) divinylbenzene-crosslinked polystyrene containing quaternary ammonium groups, a strong base anion exchange resin ("Nalcite SBR-P" of Nalco Chemical Co.) The material is then evaporated to dryness.

The yield of 88% of mixed mono PE and TME. Theoretically the product would contain 40.5% of mono PE and 59.5% of TME for a hydroxyl content of 44.8%. Analysis shows 42.0% mono PE and a hydroxyl content (determined by standard acetic anhydride-pyridine method) of 43.21%.

EXAMPLE 2

In this example, acetaldehyde and propionaldehyde are reacted with formaldehyde, the mole ratios being 2.0:2.0:14.3.

The procedure of Example 1 is followed except that 198.4 lbs. of water are mixed with 128.7 lbs. of 34.02% aqueous formaldehyde; 8.8 lbs. of acetaldehyde and 11.6 lbs. of propionaldehyde are used, and 60% of the lime slurry are added with the acetaldehyde. The final aldehyde end point is 0.56%.

The yield of mixed mono PE and TME is 87.3%. The theoretical proportions of mono PE and TME are 53.2% and 46.8%, respectively, for a hydroxyl content of 46.0%. Analysis shows 52.6% mono PE and a hydroxyl content of 44.28%.

EXAMPLE 3

In this example, acetaldehyde and propionaldehyde are reacted with formaldehyde, the mole ratios being 1:3:13.6.

Over a period of ½ hour, 11.1 g. of acetaldehyde (0.25 g. mole) and one-fourth of a lime slurry prepared by mixing 48.0 g. of lime and 152 g. of water are added to an aqueous formaldehyde solution prepared by mixing 378.8 g. of water with 300.2 g. of 34% formaldehyde (3.4 g. mole). The temperature is kept below 30° C. Thereafter the mixture is stirred for 2 hours. Propionaldehyde, 44.9 g. (0.75 g. mole) and the remainder of the lime slurry are then added, the propionaldehyde addition taking 1½ hours and the lime addition taking 1 hour. The temperature is maintained below 30° C. The vessel containing the lime slurry is washed with 15 g. of water which is added to the reaction mixture. The mixture is then stirred to an aldehyde end point below 0.4% and the pH reduced to 6 with formic acid. The material is filtered, subjected to ion exchange treatment and evaporated to dryness as in Example 1.

The yields of mixed mono PE and TME for two replicate runs are 91.77% and 93.55%; and the values for the two runs are: 27.96% and 27.48% mono PE and 43.00% and 43.37% hydroxyl content, respectively. The theoretical values are 27.4% mono PE and 44.55% OH.

EXAMPLE 4

In this example, acetaldehyde and propionaldehyde are reacted with formaldehyde, the mole ratios being 1:6:24.

Over a period of ½ hour, 6.4 g. of acetaldehyde (0.145 g. mole) and one-fourth of a lime slurry prepared by mixing 48 g. of lime with 152 g. of water are added to aqueous formaldehyde solution prepared by mixing 390 g. of water with 302.3 g. of 33.74% aqueous formaldehyde (3.4 g. mole). The temperature is held at 30° C. The mixture is stirred for an additional hour after which 52.3 g. of 97.77% propionaldehyde and the remainder of the lime slurry are added, the propionaldehyde addition taking 1½ hours and the lime addition taking 1 hour. The temperature is held at 30° C. The mixture is stirred to an aldehyde end point of under 0.4%, and the pH reduced to 6 with 7 ml. of 89% formic acid. The material is filtered, subjected to ion exchange treatment and evaporated to dryness as in Example 1.

The yields of mixed mono PE and TME for two replicate runs are 89 and 91%; and the values for the two runs are 14.63% and 16.08% mono PE and 42.95% and 43.06% OH, respectively. The theoretical values are 16.05% mono PE and 43.6% OH.

EXAMPLE 5

In this example, acetaldehyde and butyraldehyde are reacted with formaldehyde, the mole ratios being 1:3:13.5.

Over a period of ½ hour, 11.1 g. of 99.6% acetaldehyde and one-third of a sodium hydroxide solution prepared by dissolving 44 g. of sodium hydroxide in 132 g. of water are added to an aqueous formaldehyde solution prepared by mixing 300.8 g. of 33.74% aqueous formaldehyde with 405.7 g. of water. The temperature is held at 30° C. The mixture is stirred for an additional hour after which 56.2 g. of 96% butyraldehyde and the remainder of the sodium hydroxide solution are added, the butyraldehyde addition taking 1½ hours and the sodium hydroxide addition taking 1 hour. The mixture is stirred to an aldehyde end point below 0.4%, and the pH is reduced to 6 with 4 ml. of formic acid. The material is filtered, subjected to ion exchange and evaporated to dryness as in Example 1.

The yields for two replicate runs are 92.9% and 90.5%, respectively, of mixed mono PE and TMP; the values for these two runs are 25.69% and 27.01% mono PE and 38.79% and 39.20% OH. The theoretical values are 25.3% mono PE and 41.0% OH.

EXAMPLE 6

In this example, acetaldehyde and butyraldehyde are reacted with formaldehyde, the mole ratios being 1:1:7.4.

The procedure of Example 5 is followed using 22.2 g. acetaldehyde (99.6%), 329.0 g. of 33.74% aqueous formaldehyde and 37.5 g. of n-butyraldehyde (96%), and half of the sodium hydroxide solution is added with the acetaldehyde.

The yield is 95.6% of mixed mono PE and TMP; the values are 45.51% mono PE and 40.53% OH. The theoretical values are 50.3% mono PE and 43.9% OH.

EXAMPLE 7

In this example, acetaldehyde and n-valeraldehyde are reacted with formaldehyde, the mole ratios being 1:3:13.5.

The procedure of Example 5 is followed using 11.1 g. acetaldehyde, 300.8 g. of 33.74% aqueous formaldehyde, 394.1 g. of water and 68.0 g. n-valeraldehyde (95%). In this case, however, the temperature during the second reaction was allowed to rise to 45° C. and held there until the aldehyde end point dropped to below 4.0%.

The yield of mixed mono PE and TMB is 80.5%; the values are 30.16% mono PE and 37.74% OH. The theoretical values are 23.5% mono PE and 38.0% OH.

EXAMPLE 8

In this example, acetaldehyde and n-valeraldehyde are reacted with formaldehyde, the mole ratios being 1:1:7.4.

The procedure of Example 7 is followed using 22.2 g. of acetaldehyde, 328.9 g. of 33.74% aqueous formaldehyde, 376.6 g. of water and 45.3 g. of n-valeraldehyde, and half of the sodium hydroxide was added during the first reaction with the acetaldehyde.

The yield of mixed mono PE and TMB is 93.3%; the values are 48.03% mono PE and 39.27% OH. The theoretical values are 52.0% mono PE and 42.6% OH.

EXAMPLE 9

This example is similar to Example 4 except that lithium hydroxide is used in place of lime as the catalyst, and the mole ratios of acetaldehyde:propionaldehyde:formaldehyde are 1:6:25.

The procedure of Example 4 is followed using 6.4 g. of acetaldehyde, 305.9 g. of 33.34% aqueous formaldehyde, 390 g. of water, 51.3 g. of propionaldehyde (100%) and the lithium hydroxide slurry is prepared by mixing 50 g. of lithium hydroxide with 152 g. of water.

The yield of mixed mono PE and TME is 99.6%, and the values are 14.68% mono PE and 41.85% OH. The theoretical values are 16.05% mono PE and 43.6% OH.

EXAMPLE 10

In this example, propionaldehyde and n-butyraldehyde are reacted with formaldehyde, the mole ratios being 1:1:6.36.

Over a period of an hour, 29 g. of propionaldehyde (100%) and half of a sodium hydroxide solution prepared by dissolving 44 g. of sodium hydroxide in 132 g. of water are added to an aqueous formaldehyde solution prepared by mixing 275.5 g. of 34.67% aqueous formaldehyde with 671 g. of water. The temperature is held at 30° C. The mixture is stirred for an additional hour at 30° C., after which 37.5 g. of n-butyraldehyde (96%) and the remainder of the sodium hydroxide solution are added over a period of an hour. After stirring for a total of 7 hours, the mixture is neutralized, filtered, subjected to ion exchange treatment and evaporated to dryness as in Example 1.

In two replicate runs the yield of mixed TME and TMP is 93.9% and 95.4%, respectively. The hydroxyl values for these two runs are 38.88% and 39.12%, respectively, the theoretical OH value being 40.2%.

Carrying out the foregoing procedure but reversing the order of addition of the aldehydes—butyraldehyde being added first and propionaldehyde being added second—results in a product having OH values of 37.95% and 38.05%, respectively, for two replicate runs.

Preparing TME alone as in the foregoing example, but not using excess formaldehyde, gives a TME product having an OH value of 41.5%. Preparing TMP alone in the same way provides a TMP product having an average OH value of about 36.0%. Combining these in a 1:1 mole ratio gives a mixed TME-TMP product having an OH value of 38.5%.

EXAMPLE 11

One tenth of a lime slurry prepared by mixing 280 parts, by weight, of lime with 1041 parts, by weight, of water are added to aqueous formaldehyde containing 697 parts, by weight, of formaldehyde (100%) and 4819 parts, by weight, of water. Then, over a period of ½ hour, 140 parts, by weight, of 99% acetaldehyde and half of the lime slurry are added. The temperature rose to a maximum of 32° C. After the addition of the acetaldehyde, the mixture is cooled to 28° C. and stirred for a total of 2 hours. One hundred and eighty-five parts, by weight, of 97% propionaldehyde and the remaining lime slurry are then added, the propionaldehyde addition taking 1½ hours and the lime addition taking 1 hour. During addition of the propionaldehyde, the temperature is held at 26–28° C. The mixture is then stirred for an additional 3 hours at 26° C. Carbon dioxide is then passed through the mixture until the pH is reduced to 6.5–7. The calcium carbonate is filtered off, and the filtrate is evaporated under vacuum to a water content in the neighborhood of 10% to precipitate calcium formate. The calcium formate is removed by centrifuging and the effluent is diluted with an equal volume of water and filtered. The filtrate is then subjected to ion exchange as in Example 1 and evaporated to dryness.

A 93.0% yield of mixed mono PE and TME is determined, with a mono PE content of 50.06% and an OH content of 44.49%.

Modification is possible in the particular procedure and techniques employed without departing from the scope of the invention.

I claim:

1. The method of making a mixture of polymethylol alkanes which comprises reacting at 10° to about 70° C. with formaldehyde, in aqueous alkaline medium having a pH of at least about 9, a first alkyl aldehyde selected from the group consisting of acetaldehyde, propionaldehyde and n-butyraldehyde to form the corresponding polymethylolalkane, there being formaldehyde present during said reaction in excess of that required for reaction with said first alkyl aldehyde in an amount of from at least 1.5 mole thereof to about 30 moles thereof per mole of said first alkyl aldehyde, and thereafter reacting at 10° to about 70° C. with said excess formaldehyde in said aqueous alkaline medium containing said polymethylolalkane at a pH of at least about 9, a second alkyl aldehyde selected from the group consisting of propionaldehyde, n-butyraldehyde and n-valeraldehyde, said second alkyl aldehyde containing at least one more carbon atom than said first aldehyde to form the corresponding trimethylolalkane, said second alkyl aldehyde being in an amount of about ⅓ mole thereof per mole of said excess formaldehyde.

2. The method of claim 1 wherein said first alkyl aldehyde is acetaldehyde.

3. The method of claim 2 wherein said second alkyl aldehyde is propionaldehyde.

4. The method of claim 3 wherein the proportion of formaldehyde is from about 7 to about 13 moles thereof per mole of acetaldehyde, and wherein the proportion of propionaldehyde is from about 1 to about 3 moles thereof per mole of acetaldehyde.

5. The method of claim 1 wherein said alkaline aqueous medium is maintained at a pH of at least about 10.

6. The method of claim 1 wherein the temperature is maintained between about 25 and about 45° C. during both reactions.

7. The method of claim 3 wherein the temperature during the reaction between said propionaldehyde and said excess formaldehyde is maintained at from about 20 to about 30° C.

8. The method of claim 1 wherein the pH of the product is reduced to below 8.

9. The method of claim 8 wherein the pH of the product is reduced to from about 6 to about 7.

10. The method of claim 8 wherein the product, after reduction of the pH, is subjected to ion exchange to remove cations, anions and color forming bodies.

11. The method of making a mixture of monopentaerythritol and trimethylolethane which comprises reacting at 10° to about 70° C. with formaldehyde, in aqueous alkaline medium having a pH of at least about 9, acetaldehyde to form monopentaerythritol, there being formaldehyde present during said reaction in excess of that required for reaction with said acetaldehyde in an amount of from about 3 to about 9 moles thereof per mole of acetaldehyde, and thereafter reacting at 10° to about 70° C. with said excess formaldehyde in said aqueous alkaline medium, containing said monopentaerythritol, at a pH of at least about 9, propionaldehyde to form trimethylolethane, said propionaldehyde being in an amount of about ⅓ mole thereof per mole of excess formaldehyde.

12. The method of claim 11 wherein said aqueous alkaline medium during both reactions is maintained with lime at a pH of at least about 10.

13. The method of claim 12 wherein the temperature during the reaction between the acetaldehyde and the formaldehyde is maintained between about 25 and about 45° C., and wherein the temperature during the reaction between the propionaldehyde and the excess formaldehyde is maintained at from about 20 to about 30° C.

14. The method of claim 13 wherein the pH of the product is reduced to below 8.

15. The method of claim 14 wherein the pH of the product is reduced to from about 6 to about 7.

16. The method of claim 15 wherein the product, after reduction of the pH, is subjected to ion exchange to remove cations, anions and color forming bodies.

17. The method of claim 1 wherein said first alkyl aldehyde is acetaldehyde, and wherein said second alkyl aldehyde is n-butyraldehyde.

18. The method of claim 1 wherein said first alkyl aldehyde is propionaldehyde, and wherein said second alkyl aldehyde is n-butyraldehyde.

References Cited

UNITED STATES PATENTS

| | | |
|---|---|---|
| 2,441,944 | 5/1948 | Remensnyder et al. |
| 3,201,480 | 8/1965 | Danziger et al. |

OTHER REFERENCES

Perlow et al.: "The Pentaerythritols" (1958), pp. 4–10 and 262–268, QD 341.A4.

LEON ZITVER, Primary Examiner

J. E. EVANS, Assistant Examiner

U.S. Cl. X.R.

260—75, 637

PO-1050
(5/69)

UNITED STATES PATENT OFFICE
CERTIFICATE OF CORRECTION

Patent No. 3,478,115          Dated November 11, 1969

Inventor(s) Jesse B. Bronstein, Jr.

It is certified that error appears in the above-identified patent and that said Letters Patent are hereby corrected as shown below:

Column 6, line 7, "(available from the Rohm and Haas Company," should be -- (available from the Rohm and Haas Company), --. Column 6, line 38, "IRA*400" should be -- IRA-400 --. Column 8, line 7, "line" should be -- lime --. Column 8, line 74 "4.0%" should be -- 0.4% --. Column 9, line 44, "an" should be -- one --.

SIGNED AND
SEALED

JUN 2 1970

(SEAL)
Attest:

Edward M. Fletcher, Jr.
Attesting Officer

WILLIAM E. SCHUYLER, JR.
Commissioner of Patents